United States Patent
Maule

[11] Patent Number: 6,115,208
[45] Date of Patent: *Sep. 5, 2000

[54] TAPE DRIVES FOR USE WITH TAPE CARTRIDGES

[76] Inventor: Hugo William Maule, 15 Piercefield Avenue, Chepstow, Monmouthshire NP6 7DN, Wales, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/951,047

[22] Filed: Oct. 15, 1997

[30] Foreign Application Priority Data

Oct. 15, 1996 [EP] European Pat. Off. ............. 96307482

[51] Int. Cl.[7] .......................... G11B 15/665; G11B 15/60
[52] U.S. Cl. ............................. 360/96.5; 360/85
[58] Field of Search ........................... 360/85, 96.5, 96.6, 360/95

[56] References Cited

U.S. PATENT DOCUMENTS

| | | | |
|---|---|---|---|
| 3,660,614 | 5/1972 | Swain et al. | 360/85 |
| 4,658,310 | 4/1987 | Kimura | 360/95 |
| 4,747,000 | 5/1988 | Godsoe | 360/96.6 |
| 4,750,062 | 6/1988 | Suzuki | 360/85 |
| 5,016,834 | 5/1991 | Sato et al. | 242/199 |
| 5,355,264 | 10/1994 | Nagatsuka et al. | 360/85 |
| 5,448,431 | 9/1995 | Kobayashi | 360/85 |
| 5,812,340 | 9/1998 | Nishijima et al. | 360/96.5 |

FOREIGN PATENT DOCUMENTS 0106065 8/1983 European Pat. Off. .
2.032.284 11/1970 France .

*Primary Examiner*—Robert S. Tupper

[57] ABSTRACT

In the tape drive which uses a tape cartridge, the cartridge housing [34] is vertically referenced with respect to a positioning pin [30] in the operative position of the cartridge, and a spring-loaded tape guide [28] which is slidable on the positioning pin [30] is vertically referenced with respect to the cartridge housing [34] to ensure proper vertical alignment of the tape guide [28] with the cartridge housing [34] and reduce wear on the edge of the tape [25].

6 Claims, 3 Drawing Sheets

TAPE DRIVES FOR USE WITH TAPE CARTRIDGES

FIELD OF THE INVENTION

This invention relates to tape drives for use with tape cartridges. The invention was conceived in connection with a magnetic digital tape drive for storage of computer data, but it will be appreciated from the following that the invention is also applicable to drives for other purposes, such as audio and video tape machines, and to drives which use other types of tape, such as optical tape.

The present invention is concerned in particular with a tape drive for use with a tape cartridge having a housing, at least one reel disposed in the housing for rotation about an axis and a length of recording tape windable on the reel, the drive having: a chassis; means for supporting the cartridge in an operative position with respect to the chassis; a read and/or write transducer for reproducing a signal from and/or recording a signal on the tape; and a tape guide having: a guide portion for guiding the tape on a path between the transducer and the reel; and a mounting portion for mounting the guide portion with respect to the chassis.

BACKGROUND ART

Such a tape drive is, of course, well known. With the desire to make tape cartridges smaller and to record data on the cartridges with increasing volumetric density, tapes have become narrower and thinner and the areal data density on the tape has become higher. With the increased areal data density, in order to provide proper writing to and reading from the tape, great precision is required in the construction of the transducer, in the tracking system and in the system for moving the tape past the transducer. Moreover, great care needs to be take by the drive in the handling of the thin, narrow and therefore delicate tape. This invention arose as a result of a concern about the feeding of the tape between the drive and the cartridge housing. If the tape is not aligned properly in its widthwise direction, wear can occur at one or both edges of the tape, caused by rubbing of the tape edge against a flange of the tape guide or the reel inside the cartridge. Correct positioning of the tape guide in the widthwise direction of the tape is important, and experiments on one type of modern DAT have shown that there is a tolerance of about ±60 μm on the tape guide position, outside of which tape edge wear can be a serious problem. In order to deal with this problem, in one current model of Hewlett-Packard tape drive the tape guide mounting portion employs a screw-threaded adjuster which can be used to adjust the position of the guide portion of the tape guide in the widthwise direction of the tape. Because of other manufacturing tolerances, it is necessary to adjust each tape drive separately as part of the manufacturing process, with a resultant increase in manufacturing time and cost.

SUMMARY OF THE INVENTION

The present invention is characterised in that: the tape guide mounting portion is mounted on the chassis such that it is engaged by the cartridge housing when the cartridge is in the operative position to register the cartridge housing with respect to the tape guide in the direction of the reel axis. As a result of this feature, the mutual alignment of the tape guide and the cartridge is automatically adjusted Preferably, the supporting means includes cartridge biasing means for biasing the cartridge for limited movement in a direction towards the tape guide mounting portion when the cartridge is in the operative position.

In one embodiment of the invention, the position of the tape guide mounting portion in the direction of the reel axis is fixed with respect to the chassis; and the movement of the cartridge in the direction towards the tape guide mounting portion is limited by the engagement of the cartridge housing with the tape guide mounting portion.

However, in an alternative preferred embodiment, the tape guide mounting portion is mounted with respect to the chassis for movement in the direction of the reel axis; tape guide biasing means is provided for biasing the tape guide mounting portion in the direction towards the cartridge housing when the cartridge is in the operative position; and the supporting means includes a positioning member mounted on the chassis for engaging the cartridge housing in the vicinity of the tape guide mounting portion; such that, in use, the cartridge housing is urged by the cartridge biasing means into engagement with the positioning member to register the cartridge housing with respect to the chassis, and the tape guide mounting portion is urged by the tape guide biasing means into engagement with the cartridge housing to register the tape guide with respect to the cartridge housing. In this case, for simplicity of construction, the tape guide mounting portion is preferably slidably mounted on the positioning member to provide for the movement of the tape guide mounting portion in the direction of the reel axis.

In the case where the drive includes a tape threading and/or cartridge loading mechanism, it is preferably operable to move the position of the guide portion of the tape guide in a plane normal to the reel axis. In the preferred embodiment, the tape guide mounting portion is rotatably mounted on the positioning member and the guide portion of the tape guide is offset from the positioning member, so that rotation of the tape guide mounting portion around the positioning member produces the movement of the guide portion of the tape guide in the plane normal to the reel axis. Accordingly, at least during part of the time when the tape is being threaded, or the cartridge is being loaded, the tape guide can be moved out of the way to facilitate threading or loading.

In the case where the drive includes a cartridge loading mechanism operable to move the cartridge along a path from a preliminary position to the operative position, a final part of the loading path is preferably generally in the direction of the reel axis to bring the cartridge housing into engagement with the tape guide mounting portion.

Preferably, during winding of the tape onto the reel, the guide portion of the tape guide is the final portion of the tape drive which engages the tape.

Preferably, the guide portion of the tape guide has a surface for engaging one face of the tape and one or two flanges for engaging one or both edges of the tape.

A specific embodiment of the invention will now be described by way of non-limiting example, with reference to the accompanying drawings.

DETAILED DESCRIPTION OF THE DRAWING

Figure 1:
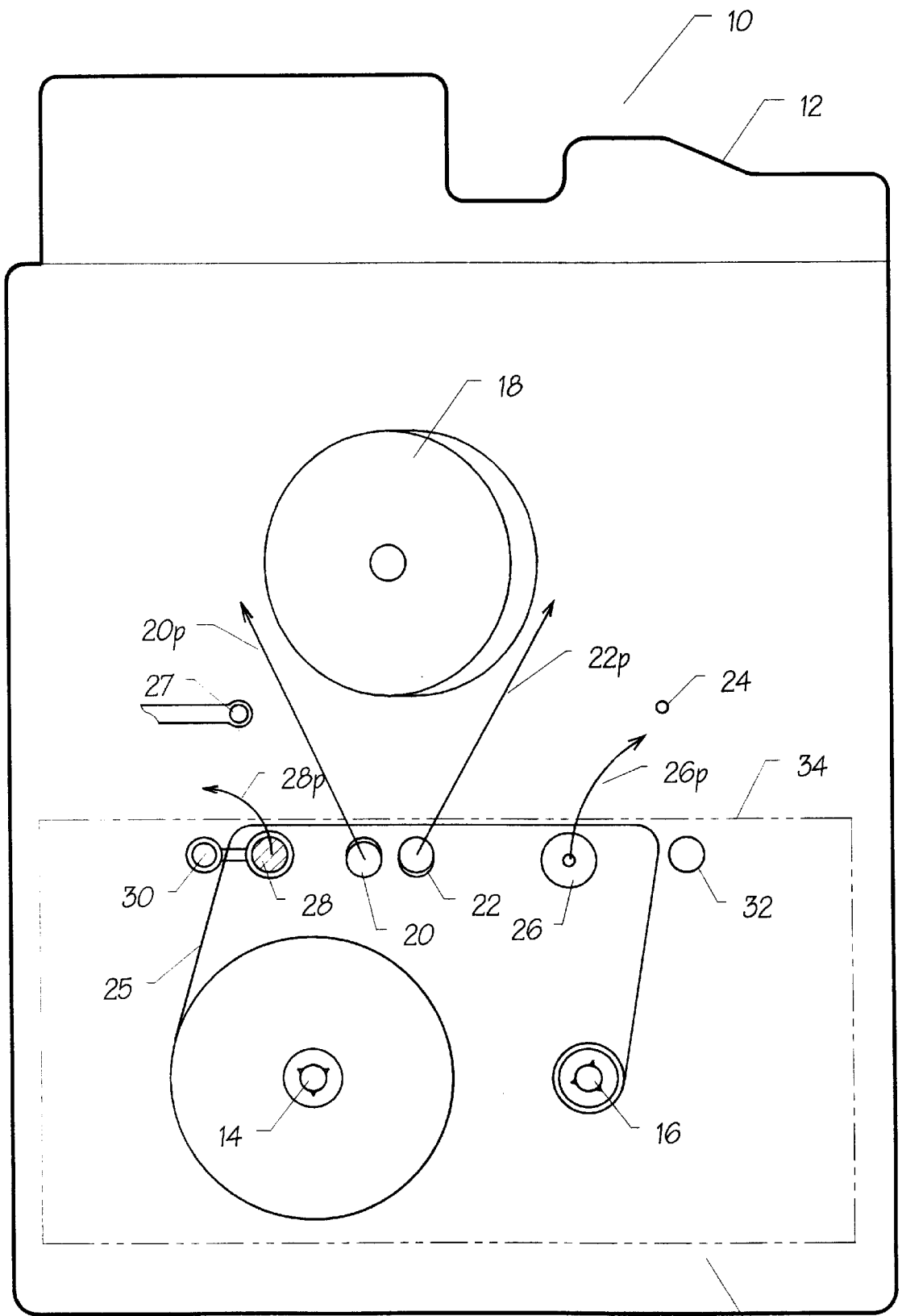
FIG. 1 is a schematic plan view of an embodiment of tape drive in accordance with the present invention, after loading of a tape cartridge but prior to threading of the tape in the tape cartridge.
Figure 2:
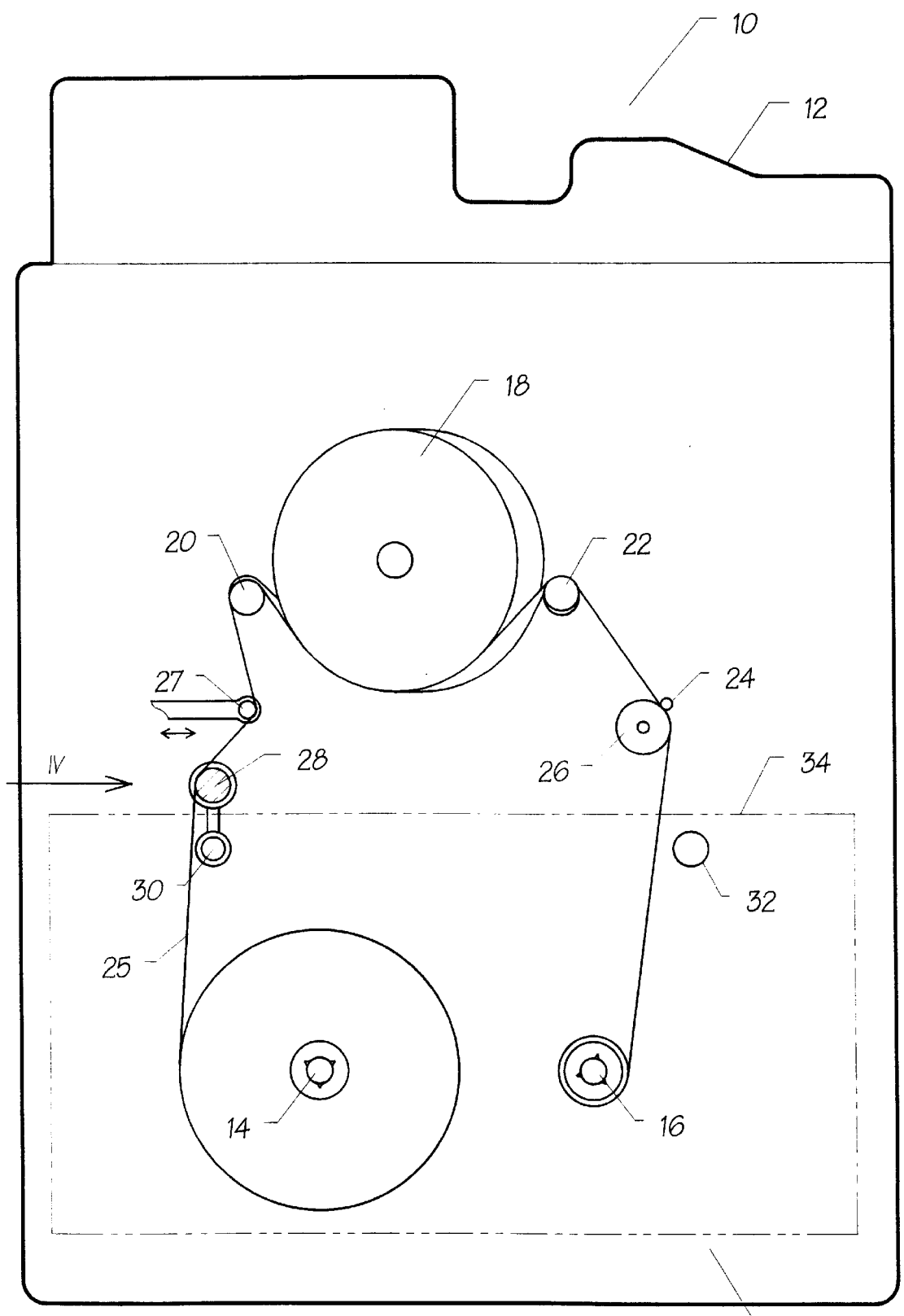
FIG. 2 is similar to FIG. 1, but with the tape threaded.

Referring to FIGS. 1 and 2, a tape drive 10 has a chassis 12 made up of one or more chassis plates. Mounted on the chassis 12 are motor-driven supply reel and take-up reel hubs 14, 16, and a helical-scanning drum 18. The drum is mounted for rotation about an inclined axis and has a pair of write heads and a pair of read heads. A pair of drum guide rollers 20, 22 are mounted on the chassis 12 and can be moved by a threading mechanism from the positions shown in FIG. 1 along the paths 20p, 22p to their operative positions shown in FIG. 2. The drum guide rollers 20, 22 are rotatable about inclined axes so as to guide tape 25 flushly past the inclined drum 18. A motor-driven capstan pin 24 and an associated pinch roller 26 are mounted on the chassis 12, and the pinch roller 26 can be moved by the threading mechanism from the position shown in FIG. 1 along the path 26p to its operative position shown in FIG. 2. A tension sensing pin 27 is also mounted on the chassis and, in use, variations in tension in the tape 25 move the pin 27, such movement being used to control a tape tensioning device operating on the supply reel hub 14. A tape guide 28 is mounted on the chassis 12 and can be moved by the threading mechanism from the position shown in FIG. 1 along the path 28p to its operative position shown in FIG. 2. A pair of positioning pins 30, 32 are also fixed to the chassis 12 and project upwards so that their upper ends provide registration surfaces for engaging the underside of the housing 34 of a tape cartridge 36 shown in phantom lines in FIG. 2.

Figure 3:
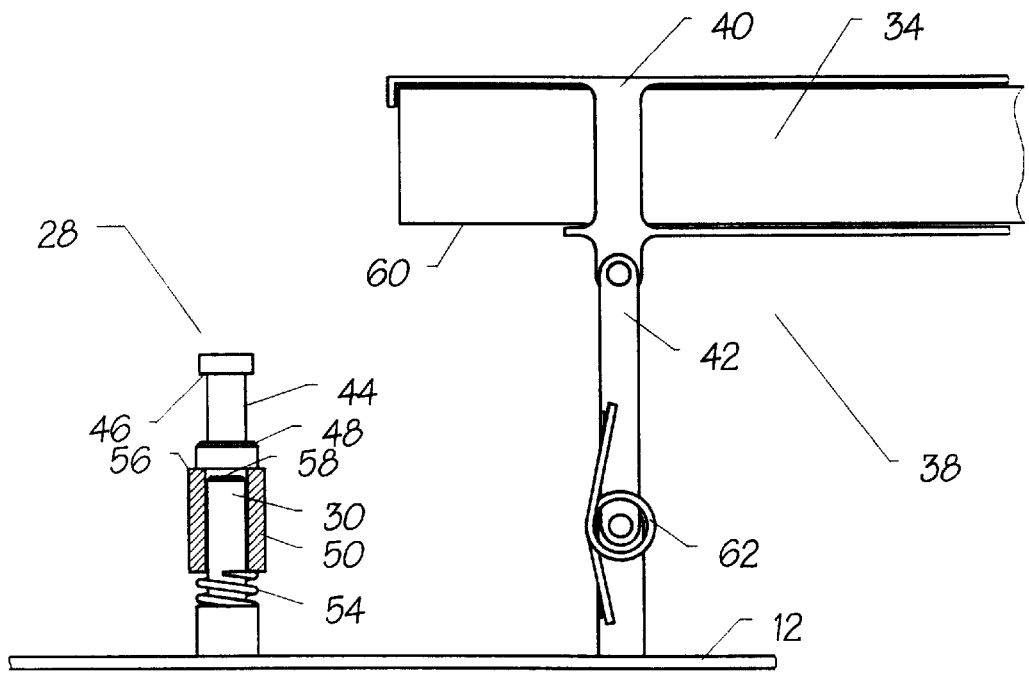
FIG. 3 is side view of part of the tape drive, at a preliminary stage during loading of a tape cartridge.
Figure 4:
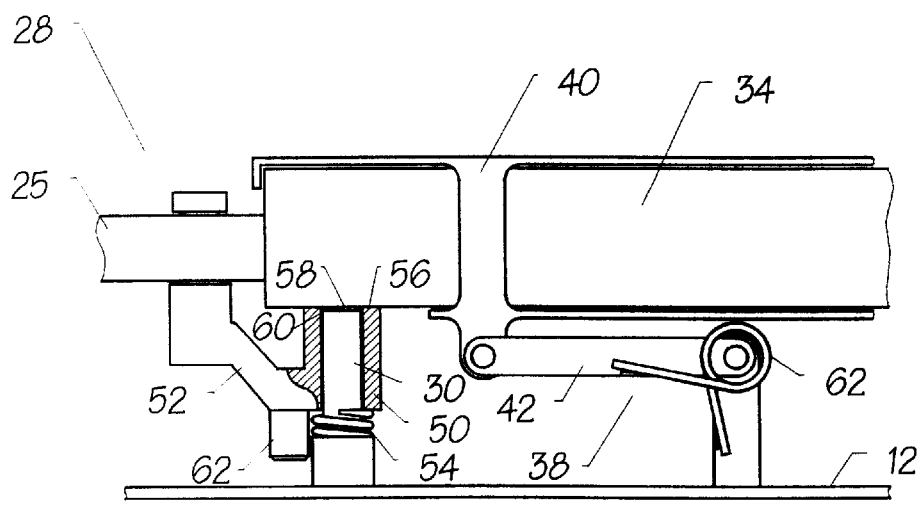
FIG. 4 is side view of part of the tape drive, looking in the direction IV shown in FIG. 2, with the tape cartridge loaded and the tape threaded.

Referring now to FIGS. 3 and 4, a cartridge loading system 38 includes a carrier 40 for holding the cartridge housing 34 and a motor driven mechanism 42 for moving the cartridge from a preliminary position, as shown in FIG. 3, to an operative position, as shown in FIG. 4. Once the cartridge is in its operative position, the tape in the cartridge extends around the tape guide 28, drum guide rollers 20, 22 and pinch roller 26, as shown in FIG. 1. The tape threading mechanism is then operated so that the tape guide 28, drum guide rollers 20, 22 and pinch roller 26 move along the paths 28p, 20p, 22p, 26p, respectively, to thread the tape, as shown in FIG. 2.

As shown in FIGS. 3 and 4, the tape guide 28 comprises a guide pin 44 having upper and lower flanges 46, 48, and a mounting portion. The mounting portion is formed by a sleeve 50, which is a snug, sliding and rotating fit on the positioning pin 30, and an arm 52 which connects the sleeve 50 to the guide pin 44 so that the axes of the guide pin 44 and positioning pin 30 are offset. A circlip or the like (not shown) may be included to prevent the tape guide 28 falling off the positioning pin 30. A compression spring 54 is fitted beneath the sleeve 50 to urge the sleeve 50 upwardly so that, in the position shown in FIG. 3, the sleeve top end face 56 is above the level of the top 58 of the positioning pin 30. However, when the cartridge 36 is loaded, as illustrated in FIGS. 2 and 4, a reference surface 60 on the lower face of the cartridge housing 34 abuts the sleeve end face 56, and one or more springs 62 of the cartridge loading mechanism cause the sleeve 50 to be pushed downwardly, overcoming the force of the spring 54, so that both the sleeve end face 56 and the top 58 of the positioning pin engage the cartridge reference surface 60. By the engagement of the cartridge reference surface 60 with the top 58 of the positioning pin 30, the cartridge 36 is vertically referenced with respect to the chassis 12, and by the engagement of the cartridge reference surface with sleeve end face 56, the guide pin 44 and its flanges 46, 48 are vertically referenced with respect to the cartridge 36. The tape guide 28 can be moved by the threading mechanism, for example acting on the boss 63, between the positions shown in FIGS. 1 and 2 whilst maintaining the vertical registration between the guide pin 44 and its flanges 46, 48 and the cartridge 36.

It will be appreciated that many modifications and developments may be made to the embodiment described above. For example, especially in the case of a drive in which there is no need for the tape guide 28 to rotate, the tape guide may be rigidly secured to the positioning pin 30 with the sleeve end face 56 being made level with the top 58 of the positioning pin 30 during manufacture.

What is claimed is:

1. A tape drive for use with a tape cartridge having a housing including (a) at least one tape reel disposed for rotation about an axis and (b) a length of recording tape that is windable on the reel, the drive including:

a chassis having a reference plane;

a structure mounted on the chassis for moving the housing from a preliminary position to an operative position;

a read and/or write transducer mounted on the chassis for reproducing a signal from and/or recording a signal on the tape;

a transport mechanism mounted on the chassis for moving the tape longitudinally from the tape reel past the transducer;

a tape guide mounted on the chassis between the reel and the transducer, the tape guide including (a) a guide portion for guiding the tape on a path between the reel and transducer, (b) a registration portion that is engaged by the cartridge housing when the cartridge housing is in the operative position, and (c) a mounting portion by which the tape guide is mounted; the guide portion, registration portion and mounting portion being fixed together; and a structure for coupling the mounting portion with the chassis so that:

when the cartridge housing approaches the operative position, the cartridge housing engages the registration portion and moves the tape guide toward the reference plane, and when the cartridge housing attains the operative position, the position of the guide portion with respect to the reference plane is defined by (a) the fixed position of the guide portion with respect to the registration portion and (b) the position, with respect to the reference plane, of the registration portion and the cartridge housing engaged therewith, whereby the guide portion is registered with respect to the tape cartridge.

2. A drive as claimed in claim 1, wherein the guide portion of the tape guide has a surface for engaging one face of the tape and at least one flange for engaging one edge of the tape.

3. A drive as claimed in claim 1, wherein the guide portion of the tape guide has a surface for engaging one face of the tape and two flanges for engaging both edges of the tape.

4. The tape drive of claim 1 wherein the coupling structure includes a compression spring for biasing the tape guide away from the reference plane and which is compressed toward the reference plane in response to the registration portion being engaged by the cartridge housing as the cartridge housing approaches the operative position.

5. The tape drive of claim 4 wherein the coupling structure includes a pin fixedly carried by the chassis, the mounting portion including a sleeve fitting around the pin, the sleeve having a shoulder engaging a first end of the spring remote from the chassis, the spring being captured between the shoulder and a surface fixed with respect to the reference plane, and the sleeve having an end face providing the registration portion.

6. The tape drive of claim 1 wherein the coupling structure includes a pin fixedly carried by the chassis, the mounting portion including a sleeve fitting around the pin, and the sleeve having an end face providing the registration portion.

* * * * *